United States Patent [19]

Kato et al.

[11] 4,142,372
[45] Mar. 6, 1979

[54] CONTROLLED ATMOSPHERE STORAGE METHOD

[75] Inventors: Kaoru Kato, Hirakata; Yasuhiko Yamashita, Toyonaka, both of Japan

[73] Assignee: Daikin Kogyo Co. Ltd., Osaka, Japan

[21] Appl. No.: 843,736

[22] Filed: Oct. 19, 1977

[30] Foreign Application Priority Data

Oct. 22, 1976 [JP] Japan .................................. 51-127698

[51] Int. Cl.$^2$ ......................... F24F 3/16; B01D 53/02
[52] U.S. Cl. ............................................ 62/78; 55/74
[58] Field of Search ...................... 62/78, 89, 94, 271; 34/27, 32; 55/74

[56] References Cited
U.S. PATENT DOCUMENTS

| | | | |
|---|---|---|---|
| 2,060,389 | 11/1936 | Wigelsworth | 34/27 |
| 3,088,290 | 5/1963 | Zearfoss, Jr. | 62/78 |
| 3,183,683 | 5/1965 | Reiter et al. | 62/78 |
| 3,421,836 | 1/1969 | Sundin et al. | 62/78 |
| 3,547,576 | 12/1970 | Sheikh | 62/78 |
| 4,092,131 | 5/1978 | Rohde | 55/74 |

*Primary Examiner*—Lloyd L. King
*Attorney, Agent, or Firm*—Cushman, Darby & Cushman

[57] ABSTRACT

In a vegetables and fruits-storing method of conventional controlled atmosphere storage including continuously feeding the air of a definite oxygen content such as, for example, 2 - 3% by volume and definite amount obtain by means of an adsorber into a refrigerator to obtain an atmosphere suitable for storage of the vegetables and fruits, an improved method wherein the improvement comprises in the first step feeding the open air and the atmosphere of the refrigerator to be recycled in such order or simultaneously into the adsorber packed with an adsorbent such as zeolite or the like which adsorbs more nitrogen than oxygen, adsorbing the nitrogen in the open air and the atmosphere and expelling the high oxygen content air of the adsorber having oxygen content lower than that of the open air but higher than that of desired atmosphere of the refrigerator, in the next step expelling a part of the remained high oxygen content air, and in the further next step, desorbing the nitrogen and the remained high oxygen content air of the adsorber to obtain the desired oxygen content air of, for example, 2 - 3% by volume and feeding the desired oxygen content air into the refrigerator, and repeating above steps; the recycling of the atmosphere in the refrigerator being carried out in order that the time for expelling said high oxygen content air of the adsorber is gradually shortened, while the time for feeding the desired oxygen content air into the refrigerator is gradually lengthened so that the amount of the desired oxygen content air obtained from a definite amount of said open air and said atmosphere can be gradually increased, to rapidly lower the oxygen content in the refrigerator to be the desired oxygen content.

4 Claims, 14 Drawing Figures

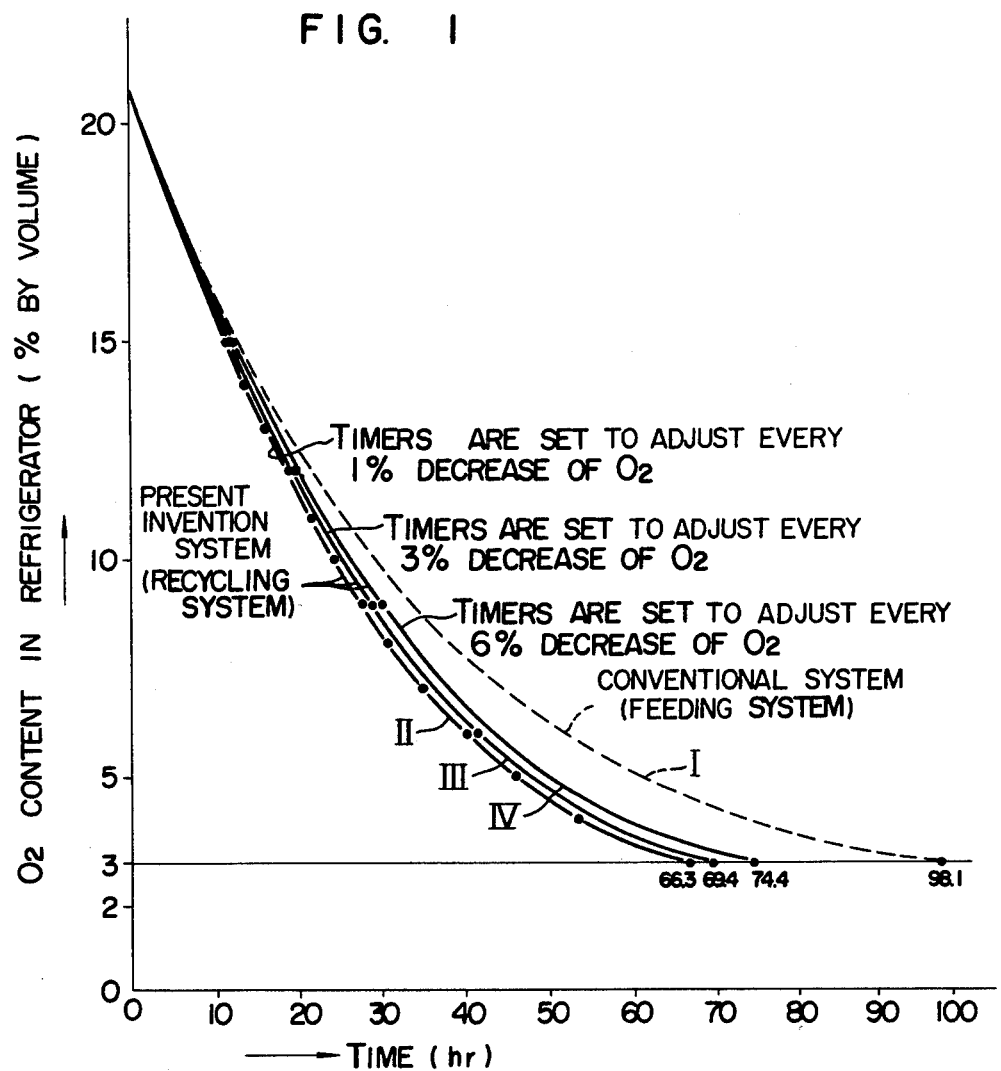
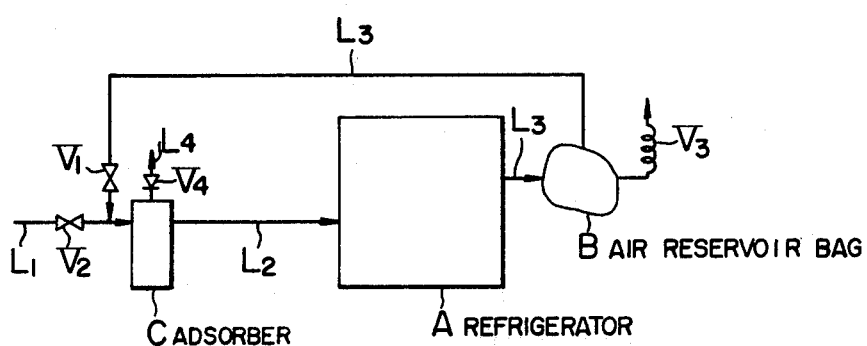

CONTROLLED ATMOSPHERE STORAGE METHOD

BACKGROUND OF THE INVENTION

This invention relates to an improvement in a conventional so-called continuous feeding method for controlled atmosphere storage (hereinafter referred to as "CA storage") including continuously feeding at a constant rate the air of a definite oxygen content (for example, 2 to 3%; the oxygen percent is by volume and the same applies hereinafter) into a storage room to maintain therein an atmosphere suitable for the storage. More particularly, this invention is to provide a CA storage method for vegetables and fruits, which, as compared with the conventional method, enables more rapid oxygen pulldown (rapid establishment of desired oxygen content in the atmosphere inside the storage room), more rapid increase to a desired level in the content of a gas component necessary for vegetables and fruits storage such as, for example, carbon dioxide, and, in addition, prevention of moisture dissipation from the storage room.

Various methods have heretofore been proposed for maintaining a storage room atmosphere at a composition suitable for the storage. These methods include (1) a common CA storage method which utilizes respiration of the vegetables and fruits themselves in effecting oxygen (hereinafter referred to as "$O_2$") pull-down, removal of the excess amount of carbon dioxide (hereinafter referred to as "$CO_2$") being effected by means of a $CO_2$ scrubber and oxygen replenishment by supplying the open air through a fan, (2) a continuous feeding method, in which an artificially prepared air of a nearly the same composition as that of the desired storage room atmosphere is allowed to feed continually and at a constant rate throughout the storage period, (3) a combination of the common CA storage method and the continuous feeding method, in which the latter method is used at the start of the storage to rapidly reduce the $O_2$ content and thereafter the same procedure as used in the former method is followed, and (4) a combustion method, in which the air withdrawn from the storage room is subjected to a combustion treatment and the resulting $O_2$ poor air is returned to the storage room.

One of the techniques used in the above-said continuous feeding method for CA storage utilizes an adsorption and desorption apparatus (hereinafter referred to as "adsorber") containing an adsorbent to separate nitrogen (hereinafter referred to as "$N_2$") and $O_2$ in the open air by adsorption and desorption and the resulting air of the desired $O_2$ content is fed continuously at a constant rate into a storage room to effect forced reduction in the oxygen content of the storage atmosphere, thus rapidly bringing the storage atmosphere conditions to a level suitable for CA storage (hereinafter such a continuous feeding method using said technique is referred to as "the conventional method").

In the conventional method, the open air is continuously supplied at a constant rate to the adsorber and the effluent air of the desired $O_2$ content (about 2 to 3%) is continuously fed at a constant rate directly into the storage room to expel the inside air of a high $O_2$ content (hereinafter such as air is referred to as an $O_2$-rich air), thus reducing the $O_2$ content of the storage room atmosphere. Reduction in $O_2$ content of the storage room atmosphere by such a procedure requires a long time, because the amount of air of the desired $O_2$ content obtained from a definite amount of air supplied to the absorber is very small and the air of low $O_2$ content (hereinafter such an air is refered to as an "$O_2$-poor air") of the desired $O_2$ content is mixed with an $O_2$-rich air inside the storage room, the resulting mixture air being discharged from the storage room. Thus, assuming that the storage room is perfectly gas-tight and the storage room atmosphere is a uniform mixture, the rate of reduction in $O_2$ content of the storage room atmosphere may be expressed by the following equation:

$$t = -\frac{V_a}{V_b} \ln \frac{C' - C}{C'' - C}$$

where
- t: time elapsed
- $V_a$: volume of the storage room
- $V_b$: amount of air feed into storage room (per unit time)
- C: $O_2$ content in % of the feed air C': initial oxygen content of the inside atmosphere of the storage room
- C'': $O_2$ content of the inside atmosphere of the storage room after the lapse of time t The curve (I) in FIG. 1 is a graphic representation of the above equation.

As indicated by the curve (I), it is apparent that when the conventional method is used, with the decrease in $O_2$ content of the storage room atmosphere, the rate of reduction in $O_2$ content also decreases, meaning that the lower is the desired $O_2$ content to be reached, the longer is the time required for the oxygen pull-down.

On the other hand, the conventional method has another disadvantage in that since $CO_2$ increased by respiration of the vegetables and fruits is continually expelled from the storage room during the $O_2$ pull-down, the $CO_2$ content of the storage room atmosphere cannot increase above a value fixed (about 3%) according to the following equation:

$$CO_2 (\%) = \frac{\text{Amount of generated } CO_2 \text{ in the storage room}}{\text{Amount of } O_2\text{-poor air fed into the storage room}} \times 100$$

In the case of the above-said combustion method (4), in which the storage room atmosphere is subjected to a combustion treatment and recycled, the $O_2$ pull-down is effected more rapidly, as compared with the above-said conventional method, but it is impossible to operate the method until a sufficiently low $O_2$ content is reached, because as the $O_2$ content of the storage room atmosphere is decreased, the amount of $O_2$ necessary for the combustion becomes insufficient, resulting in increased formation of impurities due to incomplete combustion. The said method has further disadvantages of increased installation and running costs, as compared with the above-said conventional method.

SUMMARY OF THE INVENTION

An object of this invention is to improve the conventional continuous feeding method. Based on this improvement, the present invention has been accomplished.

Another object of this invention is to establish in a storage room an atmosphere most suitable for the storage of vegetables and fruits by feeding inexpensive air to an adsorber packed with an adsorbent which adsorbs more $N_2$ than $O_2$, allowing $N_2$ in the air to be adsorbed on the adsorbent, expelling the remaining $O_2$-rich air, then separating the adsorbed $N_2$ by desorption to obtain an artificial $O_2$-poor air of the desired $O_2$ content, and feeding said artificial air into the storage room (details are given later herein). For this purpose, the expelling air from the storage room, which is discarded in the conventional method, is recycled by mixing with the open air, and the resulting air mixture is fed at a constant rate to the adsorber while gradually decreasing the time of expelling the $O_2$-rich air and gradually increasing the time of feeding the artificial air of the desired $O_2$ content to the storage room so that increasing amounts of the artificial air of the desired $O_2$ content may be obtained. In this manner, there is provided a CA storage method of the recycle type which permits of rapid decrease in $O_2$ content of the storage room atmosphere to a desired level.

A further object of this invention is to provide an improved method which permits rapidly producing an artificial $O_2$-poor air from an open air and a recycling air containing undesirable gases such as, for example, $CO_2$, moisture, ethylene, etc., which obstruct $N_2$ adsorption. To achieve the object, these gases are removed preliminarily by adsorption so that $N_2$ may be satisfactorily adsorbed from the purified air supplied to the adsorber.

A still further object of this invention is to produce an atmosphere most suitable for the storage of vegetables and fruits by preliminarily separating by adsorption those gasses such as $CO_2$ and moisture which are necessary for the storage from the open air and recycling air, then recovering said necessary gases by desorption with the $O_2$-poor air obtained from the adsorber, and feeding the recovered gases to the storage room.

BRIEF DESCRIPTION OF THE DRAWINGS

FIG. 1 is diagrams for comparison of performances of the present CA storage method of the recycling method and the conventional continuous feeding method with each other.

FIG. 2 is a basic circuit diagram of the equipment used in one embodiment of the invention.

DESCRIPTION OF THE PREFERRED EMBODIMENTS

Figure 3:
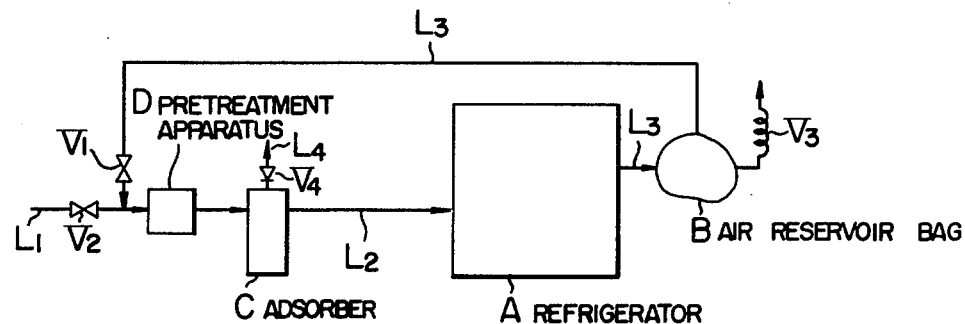
FIGS. 3 to 5 are basic circuit diagrams with respect to other embodiments.

A circuit diagram of the basic equipment according to this invention is shown in FIG. 2. Principal elements of the equipment are a refrigerator (storage room) (A), an air reservoir bag (B), an adsorber (C), an inlet line ($L_1$), an air feed line ($L_2$), an air recycle line ($L_3$), valves ($V_1$ and $V_2$) which are alternately opened and closed, and a relief valve ($V_3$). The absorber (C) is packed with an adsorbent such as zeolite or the like which adsorbs more $N_2$ than $O_2$.

The open air (containing about 21% $O_2$), used as starting material, is fed to the adsorber (C) by means of a pump (not shown in FIG. 2) through the inlet line ($L_1$) and the valve ($V_2$). $N_2$ in the air is adsorbed on the adsorbent and the resulting $O_2$-rich air is expelled through a relief valve (4) and a vent line ($L_4$). In the next step, the air from the refrigerator (A) is fed through the air recycle line ($L_3$) and the valve ($V_1$) to the adsorber (C) where $N_2$ is adsorbed and the resulting $O_2$-rich air is expelled in the same manner as in the first step. In the third step, a part of the $O_2$-rich air still remained in the adsorber (C) is expelled. In the fourth step, the adsorbed $N_2$ is generated by desorption and mixed with the air still remained in the adsorber (C) to obtain an $O_2$-poor air which is fed to the refrigerator (A). By repeating the above four steps, an $O_2$-poor air is obtained from the starting air by adsorption and desorption of $N_2$.

Of the above four steps, the first step of treating the open air and the second step of treating the atmosphere from the refrigerator (A) may be combined into one step and the third step of expelling the $O_2$-rich air from the adsorber (C) can be omitted if sufficient expelling has already been carried out in the preceding steps.

The $O_2$ content of the air to be fed to the refrigerator (A) should be as low as 3% which is a suitable $O_2$ content of the storage atmosphere, or even lower (about 2%). An air of such a low $O_2$ content (hereinafter referred to as a desired $O_2$ content) is obtained, as described later in detail, by gradually decreasing the time of expelling the $O_2$-rich air in the first step while gradually increasing the time of feeding to the refrigerator (A) the air produced on desorption of $N_2$ in the last step.

As described above, according to this invention, the expelled air from the refrigerator (A) is returned to the adsorber (C) to be utilized as a part of the starting air. By repeating the above-said four steps, the initial $O_2$ content (21%, the same as the $O_2$ content of the open air) of the air in refrigerator (A) gradually decreases and, at the same time, the $O_2$ content of the air fed to the adsorber (C) also decreases, resulting in increased formation of the air of a desired $O_2$ content which is fed to the refrigerator (A).

According to this invention, the time required to attain a desired $O_2$ content of the atmosphere in the refrigerator (A) can be greatly cut down as compared with the conventional continuous feeding method, because in the conventional method only the open air is used as the starting air without recycling the expelled air from the refrigerator (A), as contrasted with the present method, and, hence, an air of the desired $O_2$ content is formed at a constant rate, resulting in considerable consumption of time in achieving a desired $O_2$ content of the atmosphere in refrigerator (A).

For example, the results of an experiment showed that when 20 m³ of the open air (composed of about 79% of $N_2$ and about 21% of $O_2$) are used as the starting air, the open air is separated by means of an adsorber into 10 m³ of an $O_2$-rich air containing about 40% of $O_2$ and 60% of $N_2$ and 10 m³ of an air of the desired $O_2$ content containing about 2% of $O_2$ and about 98% of $N_2$. When the expelled air from the refrigerator is used as a part of the starting air and the $O_2$ content of the mixed air (20 m³ in volume) is 11.5%, there are obtained about 5 m³ of an $O_2$-rich air of the same $O_2$ content as in the above case and about 15 m³ of an air of the desired $O_2$ content.

Accordingly, when an air of the desired $O_2$ content is fed to a gas-tight refrigerator (A) and the expelled air therefrom of an $O_2$ content lower than that of the open air is recycled to be used as a part of the starting air, the formation of an air of the desired $O_2$ content in an adsorber (C) can be increased with the decrease in $O_2$ content of the refrigerator atmosphere, thus rendering it possible to successively decrease the time of expelling an $O_2$-rich air and to successively increase the time of feeding an air of the desired $O_2$ content to the refrigerator (A). consequently, it becomes possible to reduce the $O_2$ content of the refrigerator atmosphere more rapidly than in the conventional case of continuously feeding at a constant rate an air of the desired $O_2$ content into the refrigerator.

Figure 4:
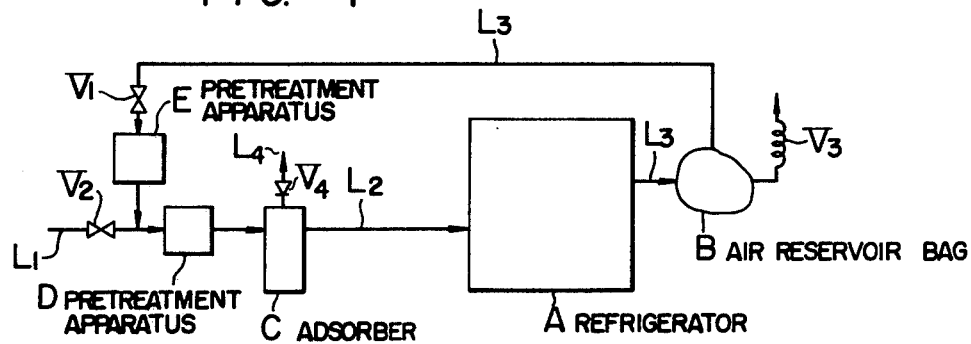
Figure 5:
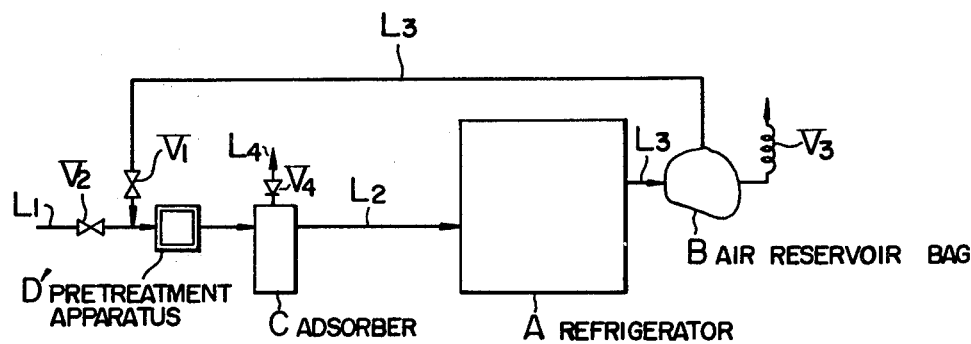

Examples of circuit diagrams of the basic equipments with respect to other embodiments of the invention are given in FIGS. 3 to 5.

In FIG. 3, a pretreatment apparatus (D) is provided upstream the adsorber (C) shown in FIG. 2. A dryer containing a desiccant such as, for example, silica gel is used as the pretreatment apparatus (D) and serves to improve the efficiency of the adsorber (C) by removing from the starting air the moisture which obstructs nitrogen adsorption in the pretreatment apparatus (D).

In an equipment shown in FIG. 4, a pretreatment apparatus (E) is additionally provided at the end of the expelled air recycle line ($L_3$) to remove undesirable gases such as $CO_2$ and moisture which obstruct the separation of $N_2$ and $O_2$ by adsorption and desorption and also ethylene and odor which are harmful in retaining the freshness of vegetables and fruits, thus preventing the refrigerator atmosphere from accumulation of undesirable gases by recycling.

The equipment shown in FIG. 5 is an example wherein there is provided upstream the adsorber (C) a pretreatment apparatus (D') in which a dryer and a harmful gas adsorber are integrated. This equipment functions similarly to the equipment shown in FIG. 4.

Figure 6:
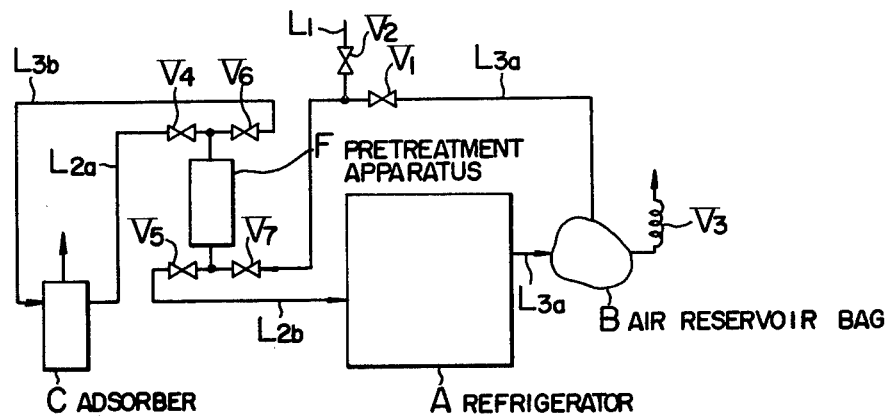
FIG. 6 is a basic circuit diagram for another embodiment.

The equipment shown in FIG. 6 in the form of circuit diagram is another example wherein there is provided upstream the adsorber (C) a pretreatment apparatus (F) to adsorb the gases necessary for the storage of vegetables and fruits. By manipulating the valves ($V_4$ to $V_7$), it is possible to adsorb the above-noted necessary gases contained in the expelled air from the refrigerator (A) and then in the next step to desorb the adsorbed gases to be returned to the rifrigerator (A).

Practical operation of the above pretreatment apparatus (F) is carried out in the way described below, when it is intended not to discard exhaustively but to retain those gases such as, for example, $CO_2$ other than $N_2$ and $O_2$ which are generated in the refrigerator (A) and are necessary for the storage of vegetables and fruits.

The recycling air is passed through the route including refrigerator (A), air recycle line ($L_{3a}$), valve ($V_1$), valve ($V_7$), pretreatment apparatus (F), valve ($V_6$), and air recycle line ($L_{3b}$) to remove temporarily $CO_2$ by adsorption in the pretreatment apparatus (F). In the next step, the air of the desired $O_2$ content obtained in the adsorber (C) by removal of $O_2$ is passed through the route including air feed line ($L_{2a}$), valve ($V_4$), pretreatment apparatus (F), valve ($V_5$), and air feed line ($L_{2b}$) to desorb the adsorbed $CO_2$ to be carried by the air to the refrigerator (A).

By use of such a procedure, the $CO_2$ generated by respiration of the vegetables and fruits is not discarded but returned again to the refrigerator (A). Consequently, as contrasted to the case of conventional method where the $CO_2$ content of the refrigerator atmosphere is limited to a constant value lower than the desired content (about 3%), the present method permits the storage atmosphere to reach a $CO_2$ content desirable for the storage, because the $CO_2$ generated by respiration of the vegetables and fruits is not discarded but returned to the refrigerator (A) and the amount of generated $CO_2$ increases in proportion to the amount of respiration.

Although the basic principle of the present method for CA storage might be well understood from the foregoing description, more detailed description is given below with reference to examples.

Figure 7:
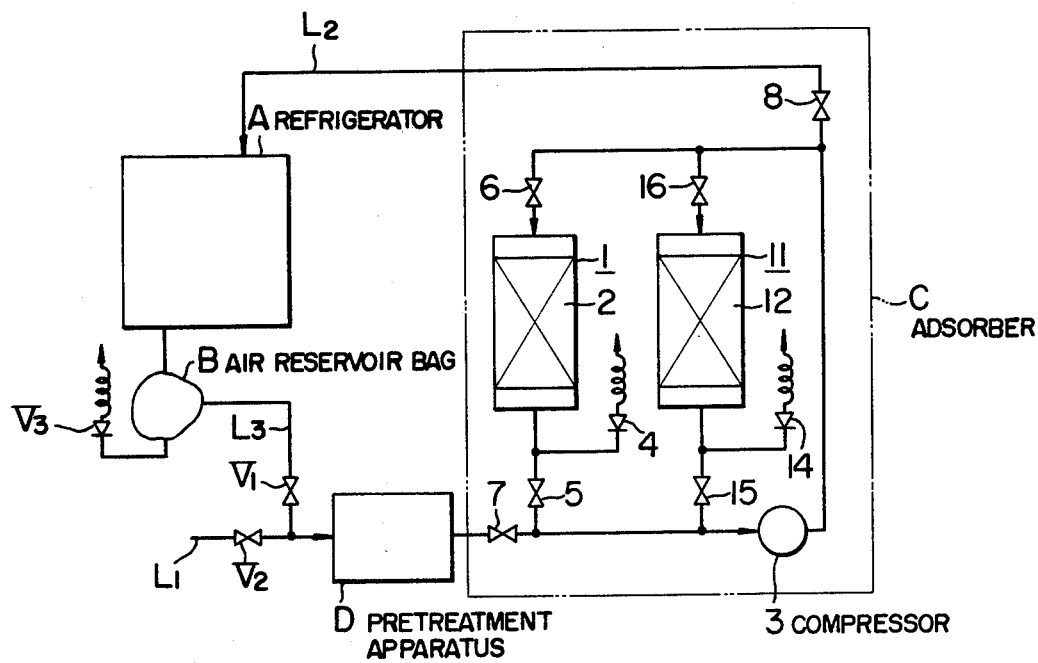
FIGS. 7 and 8 are a detailed circuit diagram of equipments shown in FIGS. 3 to 5 and a time chart for the operation of these equipments, respectively.
Figure 8:
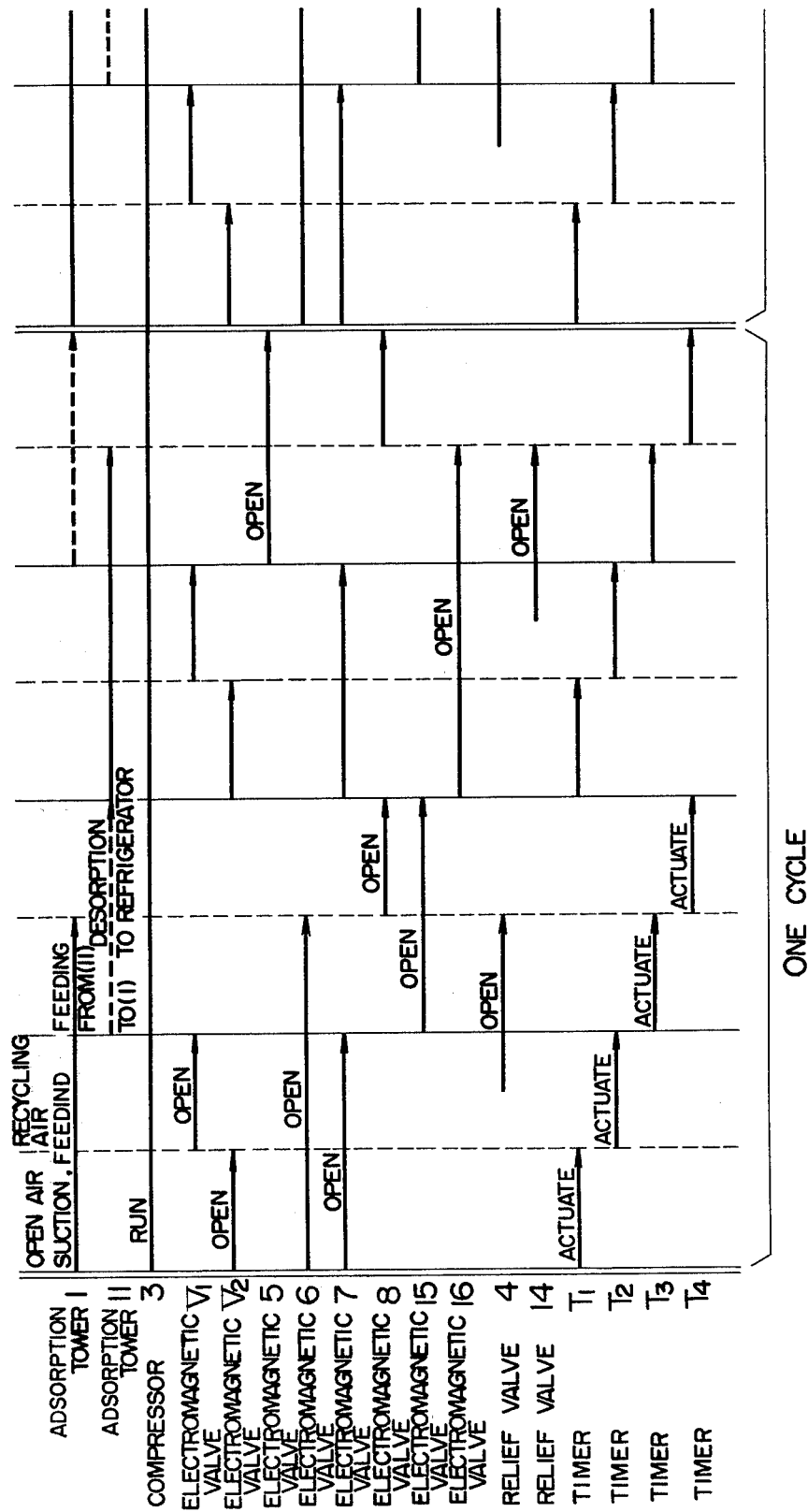

FIG. 7 and FIG. 8, respectively, are a detailed circuit diagram of the equipment shown in FIG. 3 and a time chart for the operation. As shown in FIG. 7, the adsorber (C) consists of two units of the adsorption tower shown in FIG. 3. (1) and (11) are adsorption tower packed with an adsorbent (2) and (12) such as, for example, zeolite or the like which adsorbs more $N_2$ than $O_2$. (3) is a dual purpose compressor for compression and suction. (4) and (14) are relief valves which are actuated if the pressure in the adsorption towers (1) and (11) increases above a definite value and (5), (6), (7), (8), (15) and (16) are electromagnetic valves.

The adsorption towers (1) and (11) are provided with electromagnetic valves (5), (6), (15) and (16) at top sides and bottom sides. The bottom sides of both towers are each connected through electromagnetic valves (5) and (15), respectively, to a pipe line which leads in one direction to the pretreatment apparatus (D) through the electromagnetic valve (7) and in the other direction to the air feed line ($L_2$) through the suction side and delivery side of the compressor (3) and the electromagnetic valve (8), said air feed line ($L_2$) being connected to the refrigerator (A). The top sides of both adsorption towers are each connected through the electromagnetic valves (6) and (16), respectively, to a pipe line connecting the delivery side of the compressor (3) with the electromagnetic valve (8). The connecting pipe line between the adsorption tower (1) and the electromagnetic valve (5) and another connecting pipe line between the adsorption tower (11) and the electromagnetic valve (15) are provided with relief valves (4) and (14), respectively.

The procedure of preparation of an air of the desired $O_2$ content (2 to 3%) by the use of the above adsorption towers (1), (11) is illustrated below in detail.

In FIG. 8 is shown a collective operational time chart for the adsorption towers (1), (11), compressor (3), electromagnetic valves ($V_1$), ($V_2$), (5), (6), (7), (8), (15) and (16), and control timers ($T_1$) to ($T_4$). Let the operation begin from the moment when $N_2$ desorption in the adsorption tower (1) has been completed and the tower is under a vacuum condition; in another tower (11), $N_2$ adsorption has been completed and there remains a compressed $O_2$-poor air ($O_2$ content is higher than 3% and lower than 21% which is the $O_2$ content of the open air). When the compressor (3) is set to run and the electromagnetic valves ($V_2$), (7) and (6) are opened, the supplied open air is dehydrated in the pretreatment apparatus (D) (assumed to be a dryer) and passes through the electromagnetic valve (7), compressor (3), and electromagnetic valve (6) to the tower (1) where the operation of adsorption is started and the air is gradually compressed to a superatmospheric pressure.

The operation of adsorption is continued during the timer ($T_1$) is actuated. After the lapse of time $T_1$, the timer ($T_2$) is actuated, the electromagnetic valve ($V_2$) is closed and the electromagnetic valve ($V_1$) is opened to send the atmosphere in the refrigerator (A) to the compressor (3).

When the pressure in the tower (1) reaches a definite value, the $O_2$-rich air is expelled through the relief valve (4). After a definite volume of the $O_2$-rich air has been expelled (during an interval equal to the sum of the times $T_1$ and $T_2$), the electromagnetic valves ($V_1$) and (7) are closed, the electromagnetic valve (15) is opened, and, at the same time, the timer ($T_3$) is actuated. During the time $T_3$, the $O_2$-poor air in the tower (11) is sent to the tower (1) and expelled through the relief valve (4). At the beginning, the $O_2$ content of the expelled air is the same as that of the air in the tower (1). It decreases gradually and reaches a considerably low value after the lapse of time $T_3$. At this moment, in the tower (11), the mixture of the remaining air and the adsorbed $N_2$ has become an air of the desired $O_2$ content (2%).

After the lapse of time $T_3$, the timer ($T_4$) is actuated, the electromagnetic valve (6) is closed, and the electromagnetic valve (8) is opened to feed the desorbed air of the desired $O_2$ content, from the tower (11) to the refrigerator (A). After the lapse of time $T_4$, the air in the tower (11) has been completely expelled.

At this time (when the tower (11) has been completely evacuated), the timer ($T_1$) is actuated, the electromagnetic valves (8) and (15) are closed, and the electromagnetic valves (7) and (16) are opened to feed the open air and then the air in the refrigerator to the tower (11). While the timers ($T_1$) to ($T_4$) are successively actuated, the air of the desired $O_2$ content in the tower (1) is fed to the refrigerator (A). Thereafter the abovesaid steps are repeated to operate the equipment continuously.

air during adsorption was 2 kg/cm$^2$ G (gauge pressure) and the minimum pressure of the air during desorption was −0.9 kg/cm$^2$ G. The experimental refrigerator (A) had a volume of 4,000 liters. The method according to this invention and the conventional method were tested for comparison. The results obtained were as shown in Table 1.

The $O_2$ content of the air in the refrigerator (A) was 21% at the beginning of $O_2$ pull-down. The $O_2$ content was measured every one hour and the results were shown in respective columns of Table 1. In the case of the present method the time intervals $T_1$, $T_2$, $T_3$ and $T_4$ set by use of timers were 25, 25, 30 and 70 seconds, respectively, during the first hour of $O_2$ pull-down and 20, 30, 25 and 75 seconds, respectively, during the second hour of $O_2$ pull-down. Thereafter, with the decrease in $O_2$ content of the air in the refrigerator, the time ($T_1 + T_2 + T_3$) of expelling the $O_2$-rich air was successively reduced and the time ($T_4$) of feeding the air of the desired $O_2$ content from the adsorption tower to the refrigerator was successively prolonged so that the $O_2$ content of the air fed to the refrigerator may be maintained at a desired level of about 2%. By operating in this manner, the air of the desired $O_2$ content obtained from a definite amount of the starting air was increased from 1.3 m$^3$/hour to 2.3 m$^3$/hour and fed to the refrigerator.

The conventional method was carried out in the following way: The time intervals $T_1$, $T_2$, $T_3$ and $T_4$ were set to 50, 0 30 and 70 seconds, respectively, throughout the experiment and the air of the desired $O_2$ content of about 2% was fed to the refrigerator at a constant rate of about 1.3 m$^3$/hour.

Figure 13:
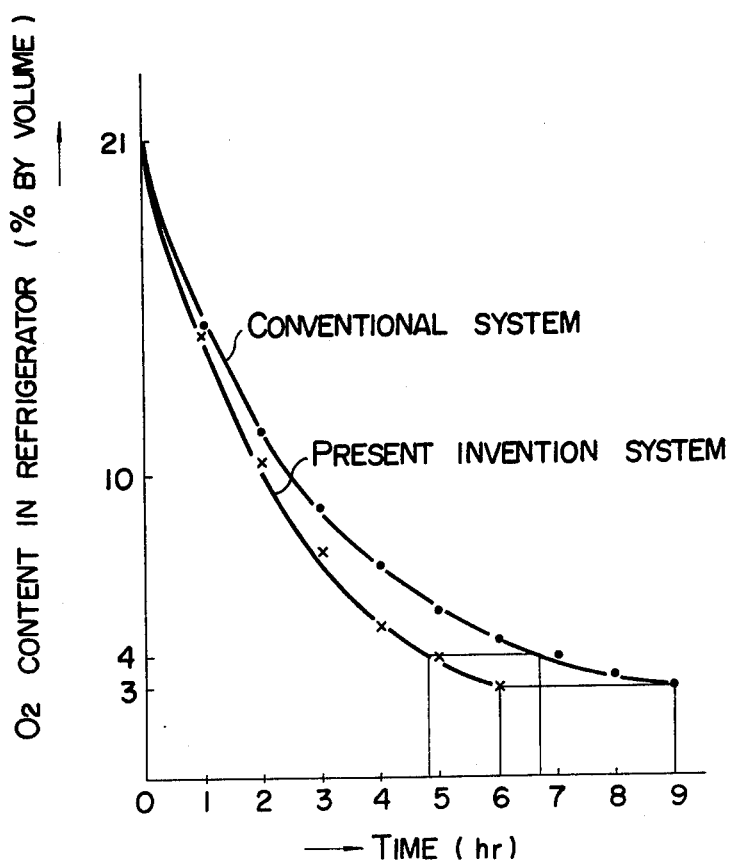
FIGS. 13 and 14 are graphic representations of Table 1 and Table 2, respectively.

As is apparent from Table 1 and FIG. 13, according to this invention, the $O_2$ content of the air in the refrigerator can be reduced to 3–4% in a period of time shorter by 2–3 hours, as compared with the case of the conventional method. Therefore, the time consumed in reducing the $O_2$ content may be saved by about 30%.

Table 1

| Time elapsed from the beginning (hour) | The present method ||||||| Conventional method |||||
|---|---|---|---|---|---|---|---|---|---|---|---|
| | Time interval (second) |||| Air of the desired $O_2$ content fed to refrigerator (m$^3$/hour) | $O_2$ content in refrigerator (%) | Time interval (second) |||| Air of the desired $O_2$ content fed to refrigerator (m$^3$/hour) | $O_2$ content in refrigerator (%) |
| | $T_1$ | $T_2$ | $T_3$ | $T_4$ | | | $T_1$ | $T_2$ | $T_3$ | $T_4$ | | |
| 0 | 25 | 25 | 30 | 70 | 1.3 | 21 | | | | | | 21 |
| 1 | 20 | 30 | 25 | 75 | 1.6 | 14.5 | | | | | | 15 |
| 2 | 15 | 35 | 20 | 80 | 1.8 | 10.5 | | | | | | 11.5 |
| 3 | 10 | 40 | 15 | 85 | 2.1 | 7.5 | | | | | | 9 |
| 4 | | | | | | 5 | | | | | | 7 |
| 5 | 5 | 45 | 10 | 90 | 2.3 | 4 | 50 | — | 30 | 70 | 1.3 | 5.5 |
| 6 | | | | | | 3 | | | | | | 4.5 |
| 7 | | | | | | | | | | | | 4.5 |
| 8 | | | | | | | | | | | | 3.5 |
| 9 | | | | | | | | | | | | 3 |

In the next place, it is explained with reference to an experimental equipment shown by FIG. 7 that the amount of obtained desired $O_2$ content air is gradually increased notwithstanding only a definite amount of air is fed into the adsorption tower owing to the recycling of air in the refrigerator (A).

Figure 9:
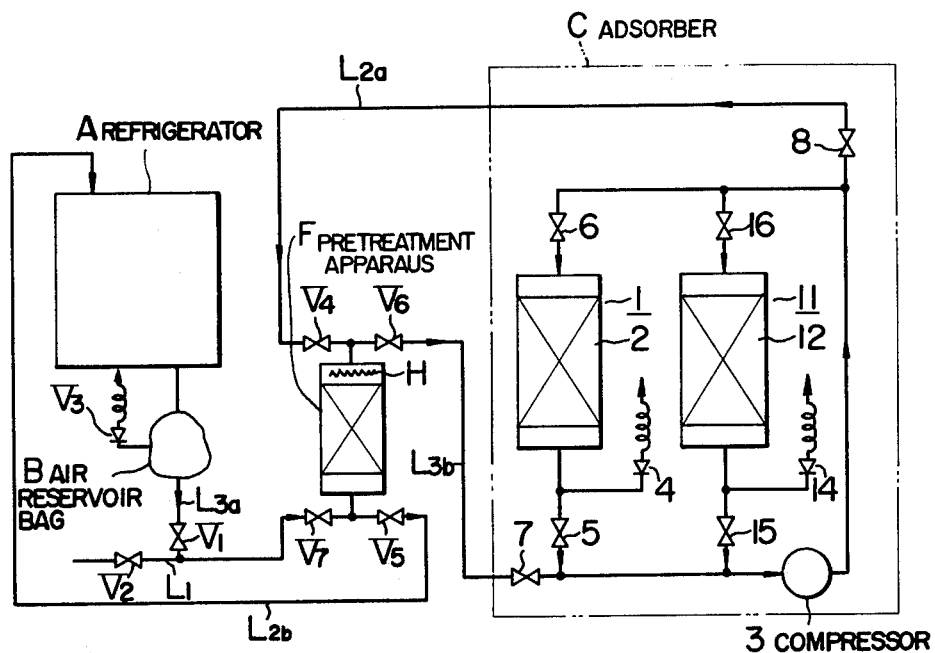
FIGS. 9, 10 and 11 are a detailed circuit diagram of the equipment shown in FIG. 6, a time chart for the operation of the equipment, and a diagram showing the pressure change in an adsorption tower, respectively.
Figure 10:
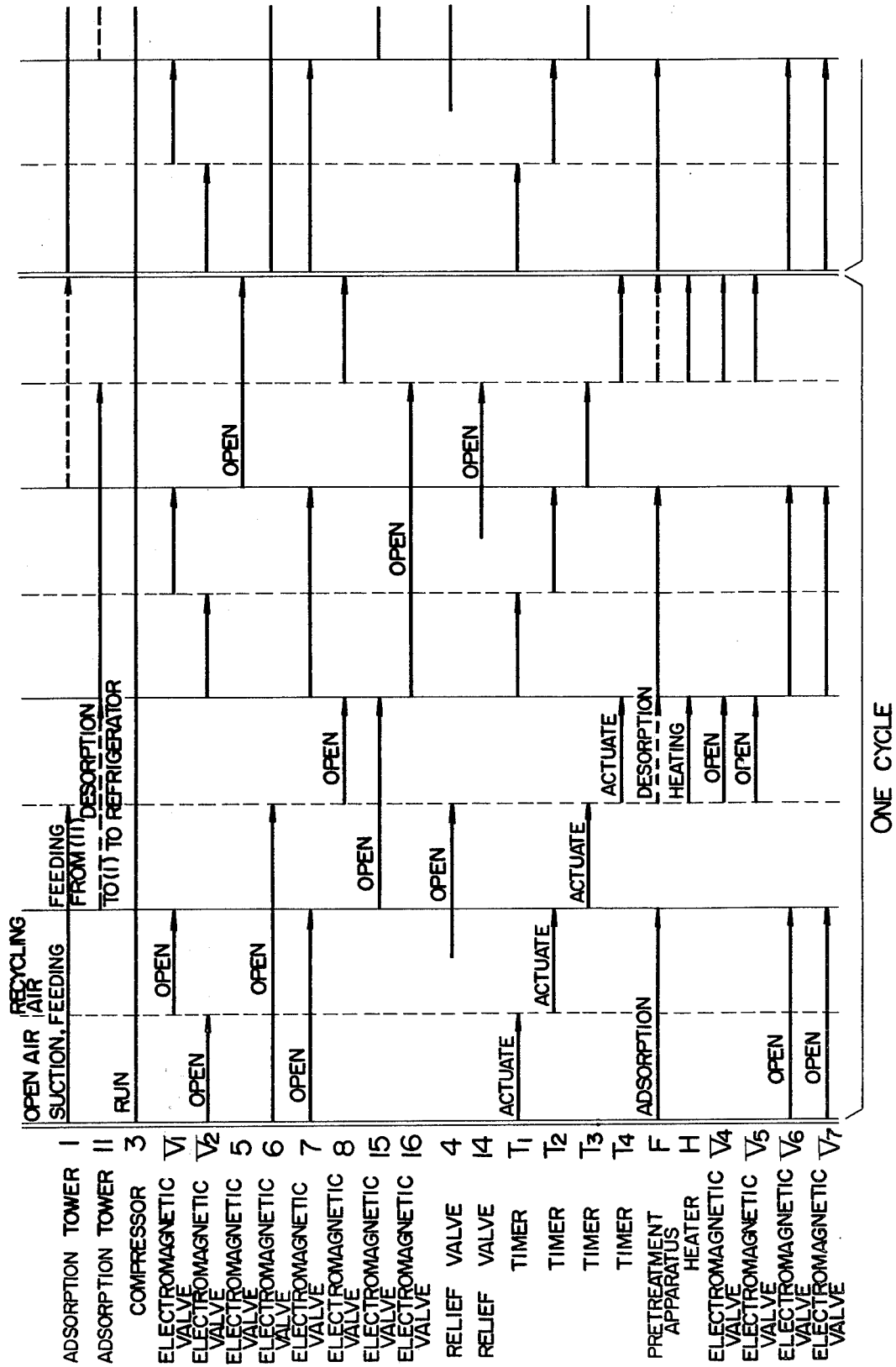

The adsorption towers (1) and (11), each 15 liters in volume, were packed with each 10 kg of an adsorbent such as synthetic zeolite or the like which adsorbs more $N_2$ than $O_2$. The compressor (3) had a no-load capacity of 200 liters per minute. The maximum pressure of the In FIGS. 9 and 10 are shown a circuit diagram and an operational time chart, respectively, of the CA storage equipment shown in FIG. 6. In this equipment, in place of the dryer (D) in FIG. 7, a pretreatment apparatus (F) is provided upstream the adsorber (C) in order to adsorb the gases necessary for the CA storage. In the adsorption stage and desorption stage, the air is passed through the pretreatment apparatus (F) alternately in reverse direction. The operation program is shown in FIG. 10. The adsorption towers (1) and (11), compressor (3), electromagnetic valves (V$_1$), (V$_2$), (5), (6), (7), (8), (15) and (16), and control timers (T$_1$) to (T$_4$) are operated in the same way as in the equipment shown in FIG. 7. In addition, a heater (H) provided in the pretreatment apparatus (F) and electromagnetic valves (V$_4$) to (V$_7$) are operated.

Throughout the period of time T$_1$ + T$_2$, in which the open air and the recycling air from the refrigerator are fed to the tower (1), the electromagnetic valves (V$_4$) and (V$_5$) are closed while the electromagnetic valves (V$_6$) and (V$_7$) remain open to pass the open air and the recycling air through the pretreatment apparatus (F) to allow CO$_2$ and moisture to be temporarily adsorbed. In the next stage, the O$_2$-poor air from the tower (11) is sent to the tower (1) and O$_2$ is expelled. This stage requires a time interval of T$_3$. After the lapse of time T$_3$, the air of the desired O$_2$ content is fed to the refrigerator (A) in a time interval of T$_4$, during which time interval the electromagnetic valves (V$_6$) and (V$_7$) remain closed and the electromagnetic valves V$_4$ and V$_5$ remain open to pass the air of desired O$_2$ content from the adsorption towers (1), (11) through the pretreatment apparatus (F) to desorb CO$_2$ and moisture. The air of the desirable O$_2$ content from the pretreatment apparatus (F) carries CO$_2$ and moisture which have been desorbed and is fed to the refrigerator (A). The heater (H) has a capacity of 4.5 KW and heats the air passing through the heater in desorbing operation of the pretreatment apparatus (F) to about 300° C. in order to improve the desorption efficiency. The pretreatment apparatus (F) is operated alternately for adsorption and desorption by employing repeatedly in reverse direction in the similar manner. If is of course possible to use a pair of the pretreatment apparatus (F) in parallel arrangement to carry out adsorption and desorption by the alternate running technique.

An example of the test conducted by use of an equipment shown in FIG. 9 including a practical refrigerator is described below.

The adsorption towers (1) and (11), each 150 liters in volume, were each packed with 100 kg of an adsorbent such as, for example, synthetic zeolite or the like which capable of adsorbs more N$_2$ than O$_2$. The compressor (3) had a capacity of 2.4 m$^3$ per hour. The maximum pressure of the air during adsorption was 2 kg/cm$^2$ G and the minimum pressure during desorption was −0.9 kg/cm$^2$ G. The practical refrigerator (A), 500 m$^3$ in volume, contained 100 tons of raw garlic. The pretreatment apparatus (F) was a twin tower type, each tower having a volume of 15 liters, and 10 kg of the adsorbent were packed in each tower. By use of the above equipment, performance characteristics were compared with those of the conventional equipment. The results obtained were as shown in Table 2.

As shown in Table 2, the O$_2$ content and CO$_2$ content of the storage atmosphere at the beginning of O$_2$ pull-down were 20% and 1%, respectively, owing to respiration of the garlic. O$_2$% and CO$_2$% in the refrigerator (A) measured at each 6 hours or 12 hours from the beginning of O$_2$ pull-down are shown in Table 2, wherein the timers' set times are as in Table 1.

Similarly to the embodiment of this invention shown in FIG. 7, it was possible to increase successively the amount of air of the desired O$_2$ content derived from a definite amount of the feed air by successively decreasing the time (T$_1$ + T$_2$ + T$_3$) of expelling the O$_2$-rich air from, for example, 65 seconds to 50 seconds and successively increasing the time (T$_4$) of feeding the air of the desired O$_2$ content from, for example, 70 seconds to 85 seconds so that a desired O$_2$ content may be maintained in the air feed to the refrigerator. Consequently, in the method of this invention, the time required for the O$_2$ pull-down to an O$_2$ content of 3% was reduced to 48 hours, as contrasted to 72 hours in the case of the conventional method.

Figure 14:
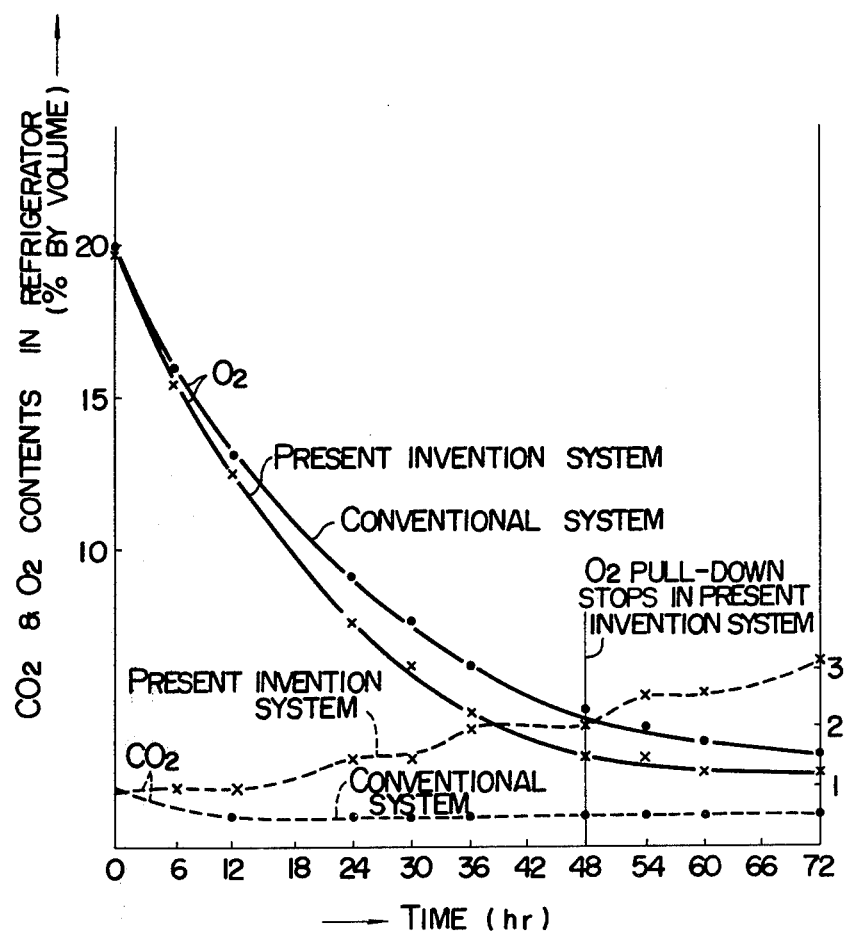

In the conventional method, the CO$_2$ content of the storage atmosphere will not increase beyond about 0.5%, because the atmosphere is continually replaced partially by fresh feed air. To the contrary, in the method of this invention, it is clearly noticeable that the CO$_2$ content continues to increase nearly correspondingly to the amount of respiration of garlic, thus contributing to the curtailment of time consumed in increasing the CO$_2$ content to a level necessary for the CA storage (FIG. 14).

In this experiment, in the case of the present method, the O$_2$ pull-down was stopped after 47 hours and the tightly closed refrigerator was left as such. Consequently, after termination of the O$_2$ pull-down, the O$_2$ content was slightly decreased and the CO$_2$ content slightly increased due to respiration.

Table 2

| Time elapsed from the beginning (hour) | The present method ||||||| 
|---|---|---|---|---|---|---|---|
| | Time interval (second) |||| Air of the desired O$_2$ content fed to refrigerator (m$^3$/hour) | O$_2$ content in refrigerator (%) | CO$_2$ content in refrigerator (%) |
| | T$_1$ | T$_2$ | T$_3$ | T$_4$ | | | |
| 0 | | | | | | 20 | 1 |
| 6 | 20 | 20 | 25 | 70 | 15 | 15.5 | 1 |
| 12 | | | | | | 12.5 | 1 |
| 18 | | | | | | — | — |
| 24 | 15 | 25 | 20 | 75 | 19 | | |
| 30 | | | | | | 7.5 | 1.5 |
| | | | | | | 6 | 1.5 |
| 36 | 10 | 30 | 15 | 80 | 23 | | |
| 42 | | | | | | 4.5 | 2 |
| | | | | | | — | — |
| 48 | 5 | 35 | 10 | 85 | 27 | | |
| 54 | | | | | | 13 | 2 |
| 60 | O$_2$ pull-down was terminated; refrigerator left as such |||| | 3 | 2.5 |
| 66 | | | | | | 2.5 | 2.5 |
| 72 | | | | | | — | — |
| | | | | | | 2.5 | 3 |

Table 2—Continued

Conventional method

| Time interval (second) | | | | Air of the desired O₂ content fed to refrigerator (m³/hour) | O₂ content in refrigerator (%) | CO₂ content in refrigerator (%) |
|---|---|---|---|---|---|---|
| $T_1$ | $T_2$ | $T_3$ | $T_4$ | | | |
| 40 | — | 25 | 70 | 15 | 20 | 1 |
| | | | | | 16 | 1 |
| | | | | | 13 | 0.5 |
| | | | | | — | — |
| | | | | | 9 | 0.5 |
| | | | | | 7.5 | 0.5 |
| | | | | | 6 | 0.5 |
| | | | | | — | — |
| | | | | | 4.5 | 0.5 |
| | | | | | 4 | 0.5 |
| | | | | | 3.5 | 0.5 |
| | | | | | — | — |
| | | | | | 3 | 0.5 |

Figure 11:
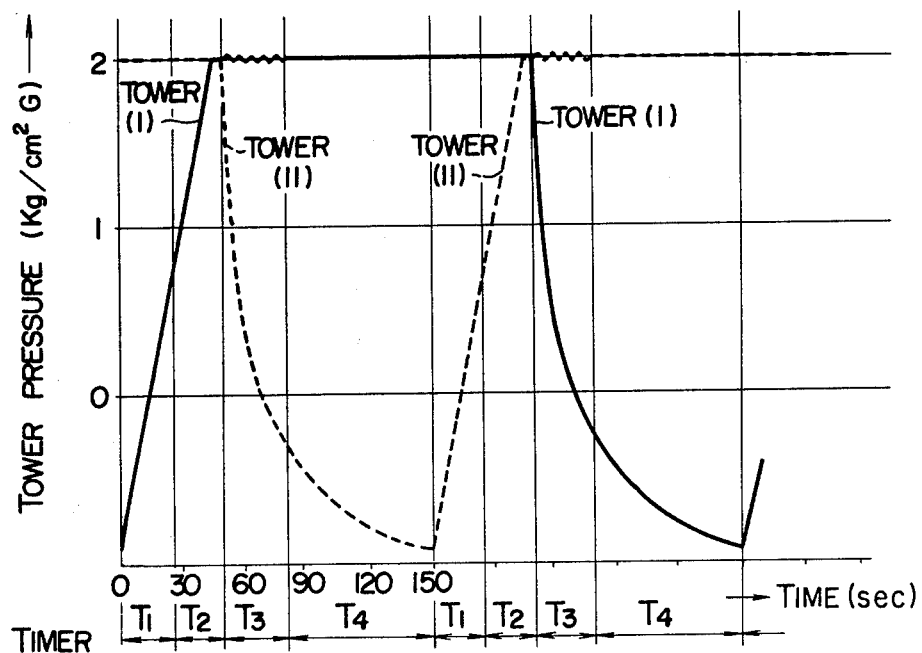

The changes in pressure with time in the adsorption towers (1) and (11) were as shown in FIG. 11.

The above two examples show the basic CA storage methods of this invention. It is needless to say that various other modified ways of controlling the storage atmosphere are also possible. Modifications of the basic methods are illustrated below with reference to FIG. 12.

Figure 12:
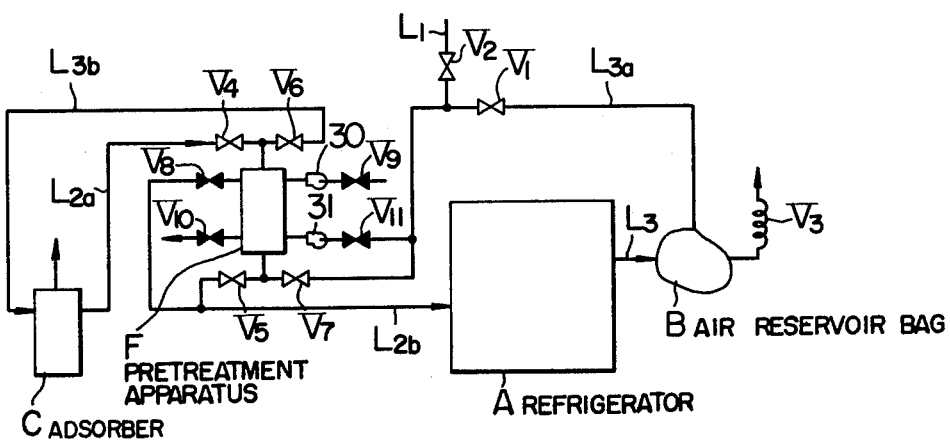
FIG. 12 is a circuit diagram with respect to various embodiments of the invention.

One of the CA storage methods is carried out in the following way:

In FIG. 12, the unoccupied space at one side of the pretreatment apparatus (F) is connected to an air outlet pipe line provided with an electromagnetic valve ($V_8$) and also to an air inlet pipe line provided with an electromagnetic valve ($V_9$) and a blower (30) in series. Another unoccupied space at the other side of the pretreatment apparatus (F) is connected to an exhaust pipe line provided with an electromagnetic valve ($V_{10}$) and also to a refrigerator feed line provided with an electromagnetic valve ($V_{11}$) and a blower (31). The O₂ pull-down is carried out in the same way as previously illustrated with reference to FIG. 9. When the CO₂ content and O₂ content have reached each the desired content, the running of the adsorber (C) is discontinued and the CO₂ content and O₂ content are maintained in the desired content by using the pretreatment apparatus (F) as a CO₂ scrubber.

Further, the above-mentioned pretreatment apparatus (F) is used for O₂ pull-down by opening the electromagnetic valves ($V_6$) and ($V_7$) to evacuate the air in the refrigerator, and then used for feeding O₂-poor air to the refrigerator by opening the electromagnetic valves ($V_4$) and ($V_5$) as in the equipment of FIG. 9. When the pretreatment apparatus (F) is used as CO₂ scrubber, the electromagnetic valves ($V_9$) and ($V_{10}$) are closed, the blower (30) is stopped, the electromagnetic valves ($V_8$) and ($V_{11}$) are opened, the blower (31) is actuated to remove CO₂ in the refrigerator by adsorption, the electromagnetic valves ($V_8$) and ($V_{11}$) are closed and the blower (31) is stopped, the electromagnetic valves ($V_9$) and ($V_{10}$) are opened and the blower (30) is actuated for recovery by desorption, then the electromagnetic valve ($V_{10}$) is closed and the electromagnetic valve ($V_8$) is opened to effect the supply of O₂.

The results of actual operations of the recycling system of this invention and the feeding system of the conventional method are shown in FIG. 1, whereby it becomes clear that the O₂ pull-down rates (II), (III) and (IV) of this invention are increased compared with the O₂ pull-down rate (I) of the conventional method. The dotted curve (I) in FIG. 1 shows a relation between elapsed time after beginning of O₂ pull-down and O₂ content in the refrigerator. The curves (II), (III) and (IV) show the recycling system wherein the times are set to adjust every 1%, 3% and 6% decreases of O₂, from the beginning of the O₂ pull-down respectively, in order to obtain possibly larger amount of desired O₂ content air.

As is clear from FIG. 1, the O₂ pull-down time of the recycling system is shortened by two-thirds to three-fourths as compared with that of the conventional feeding system.

In the recycling system, it is much preferable to adjust the timers' setting as often as possible, and a continuous adjustment of timers' setting according to decrease of O₂ content in order to always generate maximum volume of the desired O₂ content air to be blown into the refrigerator, should be ideal.

What is claimed is:

1. In a vegetables and fruits-storing method of a controlled atmosphere storage including continuously feeding the air of a definite oxygen content and definite amount obtained by means of an adsorber (C) into an airtight refrigerator (A) to obtain an atmosphere suitable for storage in the refrigerator (A), an improved method wherein the improvement comprises in the first step feeding the open air and the atmosphere of the refrigerator (A) to be recycled in such order or simultaneously into the adsorber (C) packed with an adsorbent such as zeolite or the like which adsorbs more nitrogen than oxygen, adsorbing the nitrogen in the open air and the atmosphere and expelling the high oxygen content air of the adsorber (C) having oxygen content lower than that of the open air but higher than that of desired atmosphere of the refrigerator (A), in the next step expelling a part of the remained high oxygen content air, and in the further next step desorbing the nitrogen and the remained high oxygen content air of the adsorber (C) to obtain the desired oxygen content air and feeding the desired oxygen content air into the refrigerator (A), and repeating the above steps; the recycling of the atmosphere of the refrigerator (A) being carried out in order that the time for expelling said high oxygen content air of the absorber is gradually shortened, while the time for feeding the desired oxygen content air into the refrigerator (A) is gradually lengthened so that the amount of the desired oxygen content air obtained from a definite amount of said open air and said atmosphere can be gradually increased, to rapidly lower the oxygen content in the refrigerator (A) to be the desired oxygen content.

2. The improvement according to claim 1, wherein the improvement comprises feeding said open air and said atmosphere of the refrigerator (A) into a pretreatment apparatus (D), provided upstream the absorber (C) for removing gases which obstruct the nitrogen adsorption, and then feeding said open air and said atmosphere of the refrigerator (A) into the adsorber (C).

3. The improvement according to claim 1, wherein the improvement comprises feeding said open air and said atmosphere of the refrigerator (A) in the above order or simultaneously into a pretreatment apparatus (F), which is provided upstream the adsorber (C), for adsorbing gases other than nitrogen and oxygen and necessary to store the vegetables and fruits, then feeding the air free from the adsorbed gases into the absorber (C) and adsorbing the nitrogen in the open air and the atmosphere and expelling the high oxygen content air of the adsorber (C), expelling a part of the remained high oxygen content air in the adsorber (C), then feeding the desired oxygen content air obtained by desorbing the nitrogen of the adsorber (C) into the pretreatment apparatus (F), then desorbing the gases other than nitrogen and oxygen and necessary to store the vegetables and fruits, and blowing the desired oxygen content air mixed with the desorbed gases into the refrigerator (A).

4. The improvement according to claim 3, wherein the pretreatment apparatus (F) is used as a carbonic acid gas scrubber after completion of pull-down of oxygen.

* * * * *